Oct. 12, 1926.  
J. A. SPENCER  
THERMOSTATIC CONTROL  
Filed June 1, 1922
1,602,510
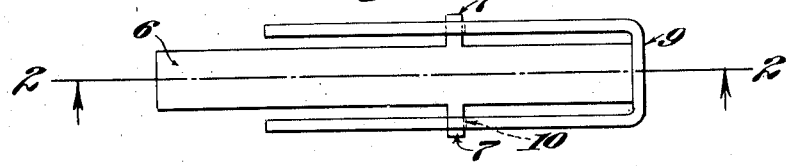
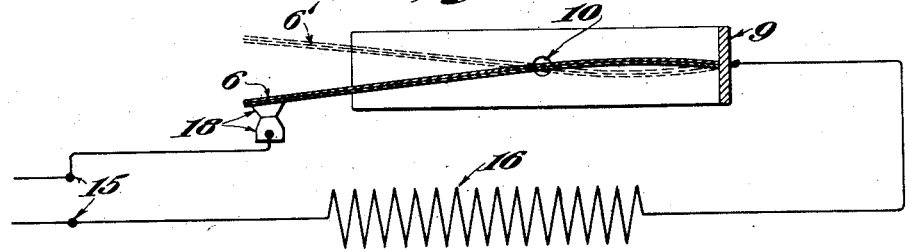
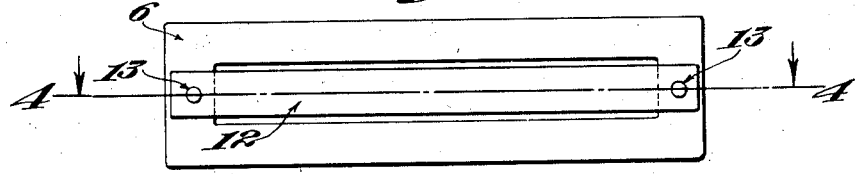
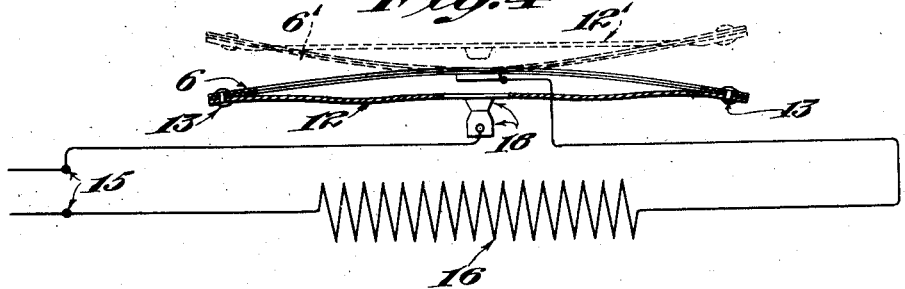

Patented Oct. 12, 1926.

1,602,510

UNITED STATES PATENT OFFICE.

JOHN A. SPENCER, OF REVERE, MASSACHUSETTS, ASSIGNOR TO SPENCER THERMO-STAT COMPANY, OF CAMBRIDGE, MASSACHUSETTS, A CORPORATION OF MASSA-CHUSETTS.

THERMOSTATIC CONTROL.

Application filed June 1, 1922. Serial No. 565,244.

The present invention relates to thermostatic control devices and more particularly to the general type of devices described in my co-pending application, Serial No. 459,773, filed April 8, 1921.

The ordinary thermostat comprising a composite flat sheet of two different metals in intimate contact has long been in use but it possesses the disadvantage of gradual motion, that is, small internal stresses caused by a rise in temperature produce correspondingly small movements in the device. Such devices are inapplicable where sudden and positive functioning is desirable, as, for example, in opening electrical circuits, as their slow motion tends to cause an arc between the contacts. My earlier application, Serial No. 459,773, discloses a thermostatic control device, which, by virtue of its configuration, offers a relatively high resistance to small internal stresses caused by the temperature changes. At predetermined temperatures, however, the stresses induced in the device become sufficient to overcome this resistance and the thermostat suddenly changes its configuration. A specific form of my previous invention contemplated the use of a non-developable surface for the thermostatic element, as a means for producing the resistance to small stresses, and consequent positive action of the device.

According to the present invention, a quick acting thermostatic control is secured by providing a normally flat thermostatic strip or sheet, which is arched or bent between its ends. With a thermostatic strip arched in this manner a tendency to change shape, due to changes in temperature, is initially resisted until a certain temperature is reached, when thereafter the strip suddenly changes to a shape of opposite curvature. In a simple form of the invention, a thermostatic strip is retained in a bowed or arched shape by the connection of its opposite ends with a rigid support. The initial changes of temperature do not substantially affect the shape of such a construction but when the change of temperature has reached a predetermined point the bowed strip suddenly reverses its curvature.

Still further features of the present invention consist in certain novel features of construction, combinations and arrangements of parts hereinafter described and claimed, the advantages of which will be obvious to those skilled in the art from the following description.

In the accompanying drawings illustrating the preferred form of the invention Fig. 1 represents a plan view of a thermostatic control; Fig. 2 is a cross section of the control upon the line 2—2 of Fig. 1 and illustrating a simple circuit connection in which the control may be embodied; Fig. 3 is a plan view of an alternative form of control; and Fig. 4 is a cross section upon the line 4—4 of Fig. 3 with accompanying circuit connection.

As illustrated in Figs. 1 and 2, the control may consist of a thermostatic strip indicated at 6 and consisting of metals of dissimilar thermal coefficients of expansion intimately united. This strip is normally flat and is confined between two spaced points in such a manner that an arch or bend is imparted thereto. To this end the strip, as indicated in Fig. 1, is provided with oppositely extending lugs 7 which are received in recesses or openings 10 formed in the legs of a U-shaped support 9. The opposite end of the strip engages with the bottom of the U-shaped support, as indicated. The construction is such that the portion of the strip between the lugs 7 and the end engaging with the support 9 is maintained in an arched condition, as illustrated in Fig. 2. With this construction, when the temperature of the strip is varied, no appreciable change in shape occurs until a certain predetermined temperature limit is reached, when thereafter the strip suddenly changes to a shape of opposite curvature, as indicated in dot and dash lines in Fig. 2. This change of shape may be conveniently employed for opening an electric circuit, as indicated. The circuit connections may comprise a source of current designated by the terminal 15, a heating coil 16, and contacts 18, one of which is fixed and one of which is mounted upon the free end of the strip. It will be evident that the heating coil may be embodied in a suitable type of electrical apparatus, as a sadiron, and the thermostatic control employed for suddenly opening the heating circuit when a predetermined temperature is reached. In addition to automatically opening the circuit upon reaching a predetermined temperature limit, this form of thermostatic control automatically returns to normal position when the temperature has dropped to a predetermined point, the thermostatic strip at this time reversing its curvature and returning to the position shown in full lines.

In addition to the construction shown in Figs. 1 and 2, the construction shown in Figs. 3 and 4 may also be usefully employed for securing the sudden opening of an electric circuit. In this construction, as indicated in the drawings, the thermostatic strip 6 may be in the form of a hollow rectangle having a resilient metallic member 12 rigidly connected to opposite ends by rivets 13. This metallic strip which may be of spring steel has the opposite end portions deflected slightly, as shown in Fig. 4, for a purpose to be presently described. With such a construction initial changes in temperature do not materially change the position of the strip 12. Upon reaching a predetermined temperature limit, the distortion of the ends of the rectangle 6 snaps the member 12 therethrough into the position shown in dotted lines, causing an abrupt opening of the circuit. As indicated in the drawings, the circuit may comprise terminals 15, heating coil 16, together with the stationary and movable contacts 18, one of which is carried upon the member 12.

While it is preferred to employ the specific construction and arrangement of parts shown and described it will be understood that this construction and arrangement is not essential except so far as specified in the claims and may be changed or modified without departing from the broader features of the invention.

The invention having been described, what is claimed is:—

1. A thermostatic control comprising a normally flat thermostatic strip, a support, and connections between the strip and support for maintaining an arched condition of the strip between two separated points, the strip suddenly changing shape upon reaching a predetermined temperature.

2. A thermostatic control comprising an elongated thermostatic strip, a rigid support, and connections between the strip and support for maintaining the strip in an arched condition between points spaced from one another, the strip suddenly changing shape upon reaching a predetermined temperature.

3. A thermostat comprising a bimetallic sheet of thermostatic metal, means forcing the sheet to remain normally concave or dished on the side having the higher thermal coefficient of expansion and preventing free expansion of said sheet when heated, said sheet when heated tending to pass abruptly and automatically to a position of an opposite curvature, and passing abruptly and automatically to said position at a predetermined temperature.

4. A thermostat comprising a bimetallic sheet of thermostatic metal, means forcing the sheet to remain normally concave or dished on the side having the higher thermal coefficient of expansion and preventing free epxansion of said sheet when heated, said sheet when heated passing abruptly and automatically to a position of an opposite curvature, and resuming its original position abruptly and automatically when cooled to a predetermined temperature.

5. A thermostat comprising composite thermostatic material and means, other than the material itself, for confining a portion of said material against free change of shape, thereby setting up internal stresses the magnitude of which changes upon changes of temperature, the thermostat reaching a condition of instability at a predetermined temperature during heating and at a predetermined temperature during cooling, the device then abruptly changing its shape.

6. A thermostat comprising composite thermostatic material and means, other than the material itself, for confining at least a portion of said material against free change of shape, thereby setting up internal stresses the magnitude of which changes upon changes of temperature, the thermostat reaching a condition of instability at a predetermined temperature during heating and at predetermined temperature during cooling, the material then abruptly changing its shape due to release of internal stresses stored up in the material by reason of the change of temperature to said predetermined value.

7. A thermostat comprising composite thermostatic material and means, other than the material itself, for confining at least a portion of said material against free expansion, thereby setting up internal stresses the magnitude of which changes upon changes of temperature, the thermostat reaching a condition of instability when it is heated to a predetermined temperature, the material then abruptly changing its shape due to release of internal stresses theretofore stored up in the material.

8. A thermostat comprising composite thermostatic material and means, other than the material itself, for confining at least a portion of said material against free expansion, thereby setting up internal stresses the magnitude of which changes upon changes of temperature, the thermostat reaching a condition of instability when it is cooled to a predetermined temperature, the material then abruptly changing its shape due to release of internal stresses theretofore stored up in the material.

9. A thermostat comprising thermostatic composite material confined against free change of shape by means external to the material itself, whereby internal stresses are set up, the magnitude of which changes upon changes of temperature, the material being so confined that change of its shape is a discontinuous function of the temperature.

10. A thermostat comprising a sheet of composite thermostatic material, external non-composite means for confining at least a portion of said sheet against free change of shape, thereby setting up internal stresses the magnitude of which changes upon changes of temperature, the thermostat being so shaped that change of its shape is a discontinuous function of the temperature.

11. A thermostat having a composite thermostatic sheet portion curved and separate means stressed by the expansion of said portion when heated, and opposing the expansion of said portion, said portion when heated to a predetermined temperature tending to pass abruptly and automatically to another shape.

12. A thermostat having a composite thermostatic sheet portion curved and means stressed by the expansion of said portion when heated and which opposes the expansion of said portion, said portion when heated to a predetermined temperature tending to pass abruptly and automatically to another shape and tending to resume its original shape automatically and abruptly when cooled to a predetermined temperature.

13. A thermostat having a composite thermostatic sheet portion and means stressed by the expansion or contraction of said portion with change of temperature and opposing said expansion or contraction, said portion when it attains a predetermined temperature tending to pass abruptly and automatically to another shape.

14. A thermostat comprising a plurality of united components having different coefficients of expansion, means normally flexing said components in one direction, tending to flatten in response to temperature change in one sense, thereby setting up stresses which oppose said tendency, until a predetermined temperature is reached, the stresses then changing the flexure.

15. A thermostatic device comprising portions arranged to react upon each other with change of temperature to set up stresses the magnitude of which changes upon change of temperature, one of the portions being formed of components having different coefficients of expansion, the device reaching a condition of instability at a predetermined temperature by virtue of the arrangement of said portions and as a result of the change of temperature, whereupon said stresses become effective to change abruptly the relative position of said portions.

JOHN A. SPENCER.